US011693924B2

(12) United States Patent
Khorasgani et al.

(10) Patent No.: US 11,693,924 B2
(45) Date of Patent: Jul. 4, 2023

(54) SYSTEM AND METHOD FOR MAINTENANCE RECOMMENDATION IN INDUSTRIAL NETWORKS

(71) Applicant: Hitachi, Ltd., Tokyo (JP)

(72) Inventors: Hamed Khorasgani, San Jose, CA (US); Chetan Gupta, San Mateo, CA (US); Ahmed Khairy Farahat, Santa Clara, CA (US); Arman Hasanzadehmoghimi, College Station, TX (US)

(73) Assignee: HITACHI, LTD., Tokyo (JP)

( * ) Notice: Subject to any disclaimer, the term of this patent is extended or adjusted under 35 U.S.C. 154(b) by 1043 days.

(21) Appl. No.: 16/433,858

(22) Filed: Jun. 6, 2019

(65) Prior Publication Data

US 2020/0387135 A1 Dec. 10, 2020

(51) Int. Cl.
*G06F 18/2323* (2023.01)
*G06N 20/00* (2019.01)
*G05B 19/406* (2006.01)
*H04L 67/12* (2022.01)

(52) U.S. Cl.
CPC ....... *G06F 18/2323* (2023.01); *G05B 19/406* (2013.01); *G06N 20/00* (2019.01); *G05B 2219/32222* (2013.01); *H04L 67/12* (2013.01)

(58) Field of Classification Search
CPC ........ G05B 19/406; G05B 2219/32222; G06N 20/00; H04L 67/12
USPC ........................................................ 706/12
See application file for complete search history.

(56) References Cited

U.S. PATENT DOCUMENTS

| 7,209,846 | B2 | 4/2007 | Tamaki et al. |
| 2015/0112897 | A1* | 4/2015 | Wang ........................ G06T 7/44 |
| | | | 706/12 |
| 2017/0339422 | A1* | 11/2017 | Said ........................ H04N 19/90 |
| 2018/0197129 | A1 | 7/2018 | Appel et al. |

(Continued)

OTHER PUBLICATIONS

Mack, Daniel L.C. et al., "Combining expert knowledge and unsupervised learning techniques for anomaly detection in aircraft flight data" at—Automatisierungstechnik, vol. 66, No. 4, pp. 291-307, Apr. 2018 (Year: 2018).*

(Continued)

*Primary Examiner* — Nicholas R Taylor
*Assistant Examiner* — Chong G Kim
(74) *Attorney, Agent, or Firm* — Procopio, Cory, Hargreaves & Savitch LLP (57) ABSTRACT

Example implementations involve fault detection and isolation in industrial networks through defining a component as a combination of measurements and parameters and define an industrial network as a set of components connected with different degrees of connections (weights). Faults in industrial network are defined as unpermitted changes in component parameters. Further, the fault detection and isolation in industrial networks are formulated as a node classification problem in graph theory.

Example implementations detect and isolate faults in industrial networks through 1) uploading/learning network structure, 2) detecting component communities in the network, 3) extracting features for each community, 4) using the extracted features for each community to detect and isolate faults, 5) at each time step, based on the faulty components provide maintenance recommendation for the network.

9 Claims, 8 Drawing Sheets

(56) References Cited

U.S. PATENT DOCUMENTS

| | | | | |
|---|---|---|---|---|
| 2018/0288438 | A1* | 10/2018 | Chao | H04N 19/12 |
| 2019/0318227 | A1* | 10/2019 | Bronstein | G06F 16/24578 |
| 2019/0354832 | A1* | 11/2019 | Bronstein | G06F 17/16 |
| 2020/0073909 | A1* | 3/2020 | Kumar | G06T 7/50 |
| 2020/0092584 | A1* | 3/2020 | Cai | H04N 19/18 |
| 2020/0228840 | A1* | 7/2020 | Fracastoro | H04N 19/625 |

OTHER PUBLICATIONS

Hamed Khorasgani, Model- and Data-driven approaches to fault detection and isolation in complex systems, Ph.D. Dissertation, electrical engineering of Vanderbilt University, Jan. 2018 (Year: 2018).*

H. Khorasgani, et al., "Fault Detection and Isolation in Industrial Networks using Graph Convolutional Neural Networks," 2019 IEEE International Conference on Prognostics and Health Management (ICPHM), 2019, pp. 1-7 (Year: 2019).*

B. Girault, A. Ortega and S. S. Narayanan, "Irregularity-Aware Graph Fourier Transforms," in IEEE Transactions on Signal Processing, vol. 66, No. 21, pp. 5746-5761, 1 Nov. 1, 2018 (Year: 2018).*

M. Defferrard et al., Convolutional neural networks on graphs with fast localized spectral filtering. In Proceedings of the 30th International Conference on Neural Information Processing Systems (NIPS'16), pp. 3844-3838, 2016 (Year: 2016).*

Zhou, J. "Graph Neural Networks: A Review of Methods and Applications" arXiv preprint arXiv:1812.08434 (2018); 20 pages.

Dong, X. "Learning Graphs from Data: A Signal Representation Perspective" arXiv:1806.00848 (2018); 38 pages.

Tremblay N. "Graph Wavelets for Multiscale Community Mining" IEEE Transactions on Signal Processing 62, (2014); No. 20; 13 pages.

Krizhevsky, A. "Imagenet Classification with Deep Convolutional Neural Networks" Advances in Neural Information Processing Systems, 2012; 9 pages.

Defferrard, M. "Convolutional Neural Networks on Graphs with Fast Localized Spectral Filtering" 30th Conference an Neural Information Processing Systems (2016), 9 pages; Barcelona, Spain.

Wagner, S. et al. "Assessing the Vulnerability of Supply Chains Using Graph Theory" Int. J. Production Economics 126 (2010) pp. 121-129; 9 pages.

Luxburg, Ulrike Von "A Tutorial on Spectral Clustering" Statistics and Computing, 2007; 32 pages; vol. 17 No. 4.

Extended European Search Report for related European Application No. 20158524.7 dated Jul. 25, 2020 (11 pages).

Papakonstantinou, N. et al. "Simulation Based Machine Learning for Fault Detection in Complex Systems Using the Functional Failure Identification and Propagation Framework" Proceedings of the ASME 2014 International Design Engineering Technical Conferences & Computers and Information in Engineering Conference, Aug. 17-20, 2014 Buffalo, New York (11 pages).

* cited by examiner

FIG. 1

Network measurements → Upload/Learn Network Structure 201 → Detect communities in the network 202 → Extract features for each Community 203 → Classification 204 → Fault detection & isolation

SYSTEM AND METHOD FOR MAINTENANCE RECOMMENDATION IN INDUSTRIAL NETWORKS

BACKGROUND

Field

The present disclosure is directed to predictive maintenance systems, and more specifically, to providing maintenance recommendations in industrial networks.

Related Art

Industrial networks such as power grids, and water supply networks are industrial systems with several interacting components. For accurate and timely maintenance recommendation in industrial networks, not only is there a need to continually monitor the condition of each individual component in the network but also, there is a need to consider the interaction between the components to determine the right maintenance actions at the right times. Maintenance recommendation in industrial networks requires encoding information about network structure and relationships between component measurements in normal operation and pre-failure conditions and then use this information in real-time to evaluate the network's components health conditions and recommend the necessary actions to avoid component breakdown, reduce unexpected downtime, and decrease the overall cost. This applies to both industrial systems with components that are explicitly connected through a physical network (such as communication and supply networks) and those industrial systems in which there is an implicit dependency between their components (i.e., same environment).

An industrial network is an industrial system with a set of components, where the components can be connected (related) to each other. For example, a power grid can be modeled as an industrial network combined from several components such as electric buses, power generators, commercial loads, etc. In the present disclosure, a component is defined as a set of parameters and a set of time series signals (measurements). The parameters define the characteristic of the component, the time series measurements represent the current state of the component. For example, an eclectic load in an electric network can be considered as a component. For this component, electrical resistance and electrical inductance of the load define the characteristics of the component, and therefore represent component parameters. However, the load electric power and electric current are time varying variables that change based on the component operating state. These variables when they are measured represent time series signals of the component.

Unpermitted deviations of a component characteristics and parameters from standard conditions are referred to as faults. Fault can occur in each component. Faults can put the operators at risk, disrupt an industrial network operation and cost industries millions of dollars. Fault detection determines the occurrence of a fault and the fault occurrence time in one or more components in the system. In the next step, fault isolation determines the faulty components in the system.

In related art implementations, machine learning based methods for maintenance recommendation use measurements from each component as the features to detect and isolate faulty components and recommend the necessary maintenance actions. Graph theory has been used to address industrial problems. In a related art example, there is a quality control system for manufacturing industrial products which models manufacturing sequences as graphs and uses the models for quality control. In another related art example, the vulnerability of supply chains are assessed by using graph theory through the use of graphs as visual tools to understand supply chain vulnerabilities and facilitate the decision-making process. Such related art implementations consider vulnerability drivers in each specific supply chain as vertices and the interdependencies between them as edges in a graph.

SUMMARY

Data-driven systems for maintenance recommendation perform fault detection and isolation tasks to recommend appropriate maintenance actions. Traditionally, machine learning based methods for maintenance recommendations use measurements from an individual component as the features to detect and isolate faulty components. This approach can lead to sub-optimal recommendations when applied to industrial networks as the correlation and dependency between different components are not considered. For example, low voltage in an electric station can be because of a fault in the station or just a reflection of fault in another node in the system. Therefore, when monitoring a component, the relationship between the measurements of that component along with the measurement from the interconnected components is far more informative compared to the measurements from the individual component.

Ignoring network structure can reduce detection rates and increase false alarms in fault detection and isolation if the components of the network are monitored separately. For example, a low voltage in the station when other stations also have low voltages can represent normal operation, but low voltage in a station when other stations have normal voltages can be a sign of a fault in the station. To capture these relationships, model-based fault detection and isolation techniques typically use system equations to extract analytical redundancies between component measurements. Unfortunately, for complex systems such as electric grids, the system models are not easy to develop, and keep updated during the system life-cycle. Therefore, reliable models of these systems are not always available. Even when models are available, they are often incomplete and plagued by uncertainties in tracking system behavior. Inaccurate and incomplete models are the main reason for high false positive and high false negative rates in model-based diagnosis methods.

To capture the relationship between components in industrial networks, example implementations described herein formulate maintenance recommendation problems as graph problems. In example implementations described herein, there is a data-driven solution for fault detection and isolation for maintenance recommendation for industrial networks which collectively uses the component measurements along with the relationship between the components (the network structure) to produce more accurate and timely diagnosis for each component. The solutions proposed herein can lead to a faster and more accurate fault detection and isolation. Such example implementations help the maintenance recommendation system to recommend appropriate actions (e.g., replacing a pump or disconnecting a tank from the network) in a timely manner and avoid additional damages.

Even though the related art implementations apply graph theory to industrial systems, there is no implementation involving artificial intelligence (AI) to learn from previous experiences and generate solutions based on the data. In example implementations described herein, fault detection and isolation are modeled for maintenance recommendation in industrial networks as a graph problem and graph theory and artificial intelligence are utilized to develop efficient solutions for this challenging problem. In a first example implementation, there is the utilization of graph theory and machine learning for maintenance recommendation. In a second example implementation, deep learning technology is utilized to achieve better results. Combining these two techniques (machine learning and graph theory) to improve maintenance recommendation is not trivial. Maintenance recommendation solutions based on machine learning operate on time series datasets. On the other hand, the graphs represent spatial relationship between the components.

Aspects of the present disclosure involve a method for managing a system having a plurality of apparatuses providing sensor data, the method involving determining a graph structure from the sensor data; detecting a plurality of communities in the graph structure; for each of the plurality of communities, conducting feature extraction to extract features regarding fault detection and isolation; and providing the extracted features to a machine learning process to generate a trained machine learning model configured to conduct fault detection and isolation for the system.

Aspects of the present disclosure can involve non-transitory computer readable medium, storing instructions for executing process for managing a system having a plurality of apparatuses providing sensor data, the instructions involving determining a graph structure from the sensor data; detecting a plurality of communities in the graph structure; for each of the plurality of communities, conducting feature extraction to extract features regarding fault detection and isolation; and providing the extracted features to a machine learning process to generate a trained machine learning model configured to conduct fault detection and isolation for the system.

Aspects of the present disclosure can involve a system having a plurality of apparatuses providing sensor data, the system involving means for determining a graph structure from the sensor data; means for detecting a plurality of communities in the graph structure; for each of the plurality of communities, means for conducting feature extraction to extract features regarding fault detection and isolation; and means for providing the extracted features to a machine learning process to generate a trained machine learning model configured to conduct fault detection and isolation for the system.

Aspects of the present disclosure can involve a management apparatus configured to manage a system having a plurality of apparatuses providing sensor data, the management apparatus involving a processor, configured to determine a graph structure from the sensor data; detect a plurality of communities in the graph structure; for each of the plurality of communities, conduct feature extraction to extract features regarding fault detection and isolation; and provide the extracted features to a machine learning process to generate a trained machine learning model configured to conduct fault detection and isolation for the system.

BRIEF DESCRIPTION OF DRAWINGS

FIG. 5($a$) illustrates a graph convolutional layer in a graph convolutional neural network, in accordance with an example implementation.

FIG. 5($b$) illustrates fault detection and isolation in accordance with an example implementation.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations involve the follow aspects. In the first aspect, the problem of fault detection and isolation in industrial networks is formulated by defining a component as a combination of measurements and parameters, and by defining an industrial network as a set of components connected with different degrees of connections (weights). Faults are also defined in the industrial network as unpermitted changes in component parameters. Finally, fault detection and isolation in industrial networks are formulated as a node classification problem in graph theory.

Example implementations involve a solution to detect and isolate faults in industrial networks. The solution involves processes such as 1) uploading/learning network structure, 2) detecting component communities in the network, 3) extracting features for each community, 4) using the extracted features for each community to detect and isolate faults, 5) at each time step, based on the faulty components, provide a maintenance recommendation for the network.

As described herein, the fault detection and isolation problem are defined for industrial networks with several components as follows.

Definition 1 (Component): A component, $c=(c_\theta, c_x)$ is a unit in the industrial network characterized by a set of parameters, $c_\theta$ and a set of time series measurements (signals), $c_x$.

Figure 1:
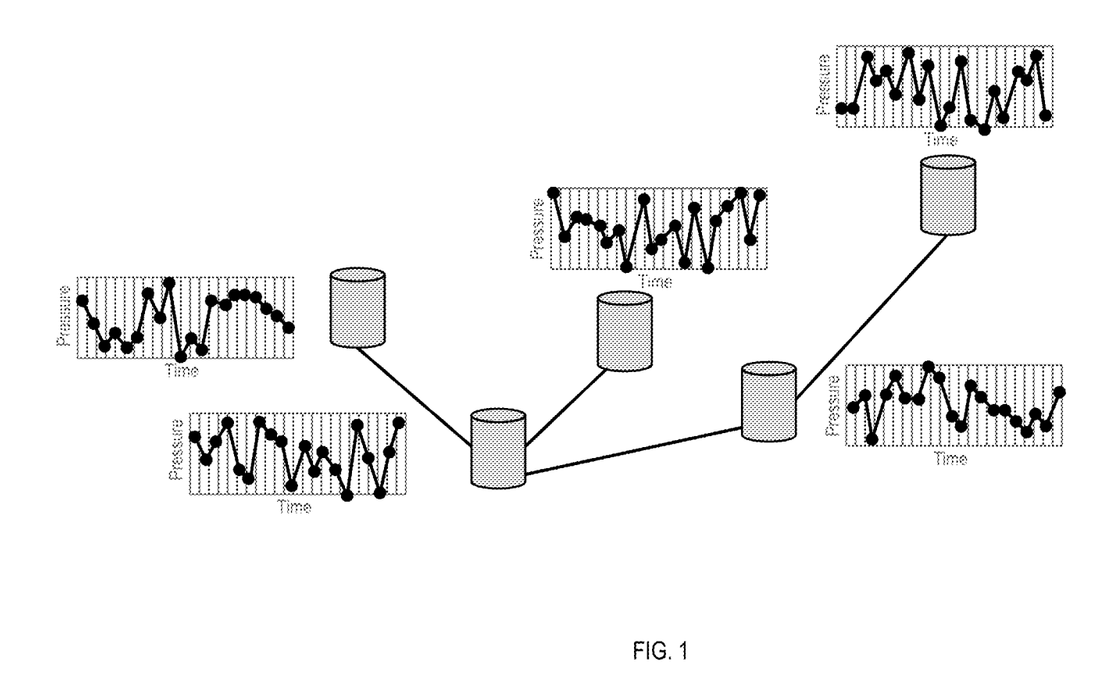
FIG. 1 illustrates an example water supply network, in accordance with an example implementation.

The parameters define the characteristic of the component, the time series measurements represent the current state of the component. FIG. 1 illustrates an example water supply network, in accordance with an example implementation. In this example, a graph can represent the connection between the components. Moreover, each tank has a time series signal (tank pressure). In example implementations described herein, there are solutions to use the time series signals and the spatial relationship between the components to achieve a maintenance recommendation solution with higher accuracy than related art implementations.

Consider the water supply network in FIG. 1 as an industrial network. Each tank is a component in this network. Tank capacity defines the characteristic of the tank, and therefore represents a component parameter. However, the water pressure in the tank is a time varying variable that changes based on the component operating state. This variable when it is measured represents a time series signal of the component.

Definition 2 (Industrial Network): An industrial network $S=(C, W)$ is defined as a set of components, and a set of weights where the connection between component $c_i \in C$ and component $c_j \in C$ are represented by $w_{ij} \in W$.

As an example, the water supply network represented by FIG. 1 is an industrial network combined from five components. Note that the definition of connected components can be different based on the application.

Weights can be binary variables where $w_{ij}=1$ when $c_i$ and $c_j$ are connected and $w_{ij}=0$ otherwise. The weights also can represent the degree of connection, such as distance, and correlation between components.

Assumption 1 (Homogeneous Components): assume that the components in industrial network have the same type and the same number of measurements. For example, for the water supply network, it is assumed that all the components have the same type of instrumentations such as pressure meter, though not necessarily the same parameters.

Assumption 2 (Static Network): assume that the number of components in the network and their connection (connection weights) do not change during the network operation.

Definition 3 (Fault): An unpermitted deviation of component parameters from standard condition is referred to as a fault.

Fault can occur in each component. Faults can put the operators at risk, disrupt the manufacturing processes and cost industries millions of dollars. Fault detection and isolation (FDI) is a critical step for timely maintenance recommendation. FDI in industrial networks is defined as follows.

Definition 4 (FDI in industrial networks): Fault detection determines the occurrence of a fault and the fault occurrence time in one or more components in the network. In the next step, fault isolation determines the faulty components in the system.

Now, FDI is formulated in industrial network problems as a node classification problem over undirected graphs. To detect and isolate a faulty component, it is not enough to monitor the component measurements. An unexpected behavior of a time series measurement could occur due to a fault in the component or a fault in a related component. For example, an unexpected pressure drop in a tank in the water supply network could be a sign of leakage (fault) in the tank or a leakage in a connected tank. Therefore, using only local measurements for fault detection and isolation can decrease the detection rates and increase false alarms. On the other hand, using all the system measurements without considering the connection between the components can lead to overfitting in the training step which can also result in low detection rates and high false alarm rates in the application step. To capture the relationship between the components and develop more accurate maintenance recommendation solution for industrial networks with several components, the problem of fault detection and isolation is formulated in these systems as node binary classification problems in graphs.

In models of example implementations herein, each node represents a component. Measurements associated with each component represent the data defined on the node associated with that component. The graph structure encodes pairwise relationship between the components, such that 1) edges show the connection between components, 2) weight of the edges show the degree of connection between components. The graph structure (the edges between components and the weight assigned to each edge) is either provided by the domain expert or learned from operation and sensor measurements, depending on the desired implementation. Further, the time series measurements along with the graph structure are used to classify each node (component) as normal or faulty, and to provide the maintenance recommendation for the faulty nodes.

In graph theory, the number of hops means the minimum number of nodes that are to be passed to get to the destination. K-hop neighborhood of each node is the set of nodes that are reachable from the node in maximum k hops. 1-hop neighbor components represent the immediate neighbors of each component. It is intuitive to consider 1-hop neighbor components for maintenance recommendation. However, in many cases it is not enough to analyze 1-hop neighbor measurements and thus example implementations consider higher order neighbors for accurate fault detection and isolation in maintenance recommendation.

In example implementations described herein, there is a system and method to develop maintenance recommendation for industrial networks. There are three main steps in the proposed approach. Example implementations first model the industrial network as a graph structure. The graph structure can be provided or can be learned from the provided measurements. Next, example implementations detect the communities of related components in the network. The health condition of the components in each community is highly related to each other. In an example implementation for this step, spectral clustering can be utilized to detect the communities. Such an example implementation only uses the graph structure for community detection. Using this approach, simplifies the solution computationally. However, the graph wavelet transform (which uses graph and the signal defined over it) can also be utilized to detect the communities. In that scenario, example implementations use the normal signal data and the graph structure to detect the communities. In the third step, example implementations extract a set of features for each community which represents the component measurements and their relationship to each other. Finally, the example implementations use the extracted features to perform fault detection, and isolation tasks in maintenance recommendation.

Figure 2:
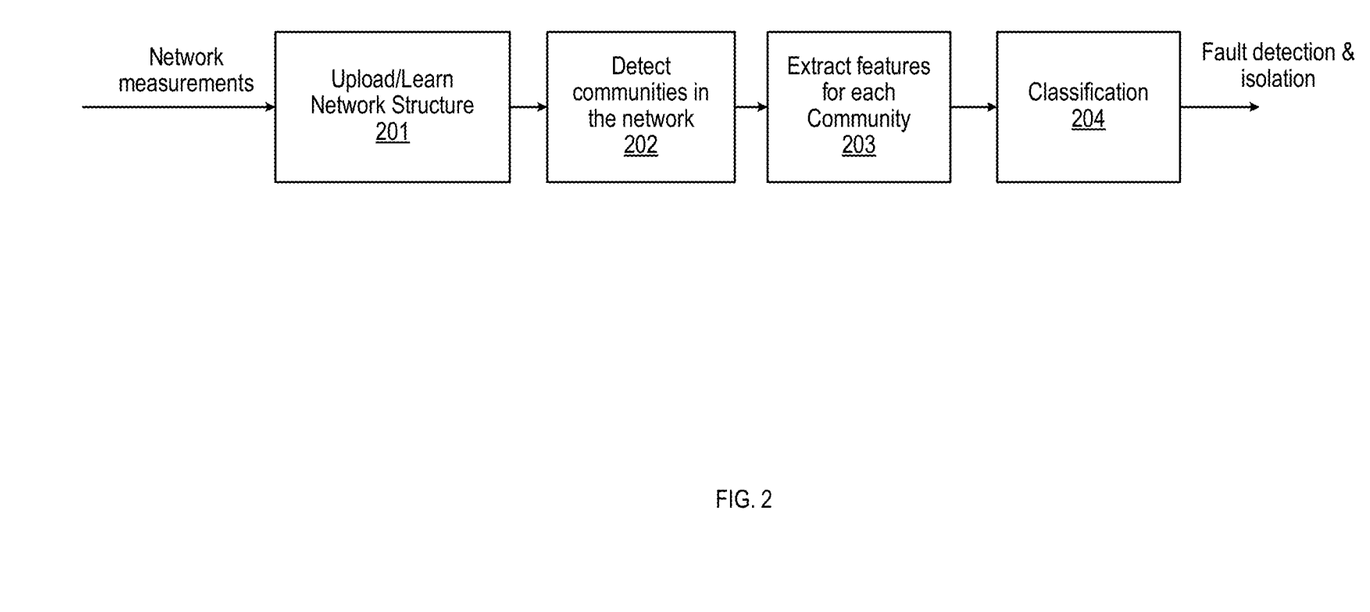
FIG. 2 illustrates the flow for fault detection and isolation in industrial networks, in accordance with an example implementation.

FIG. 2 illustrates the flow for fault detection and isolation in industrial networks, in accordance with an example implementation. As is illustrated in FIG. 2, the overall strategy for maintenance recommendation in industrial networks involves obtaining or learning the graph structure from the data measurements at 201. Through the example implementations described herein, each component has variables and parameters in the form of sensor data that may have some dependent level of connection with other components. Thus, a graph structure involving the components as represented as nodes in the graph is constructed, with the nodes connected to each other with different weight and each node also had to set up variables and parameters. In example implementations, when a component fails in accordance with the sensor data, such failure can be detected and isolated.

At 202, the flow detects the communities in the graph. At 203, the flow extracts the important features for each community. At 204, the extracted features are then used for classification to conduct for fault detection and isolation. From the classification, the example implementations can thereby provide a maintenance recommendation for faulty components through construction of a trained machine learning model.

Figure 3:
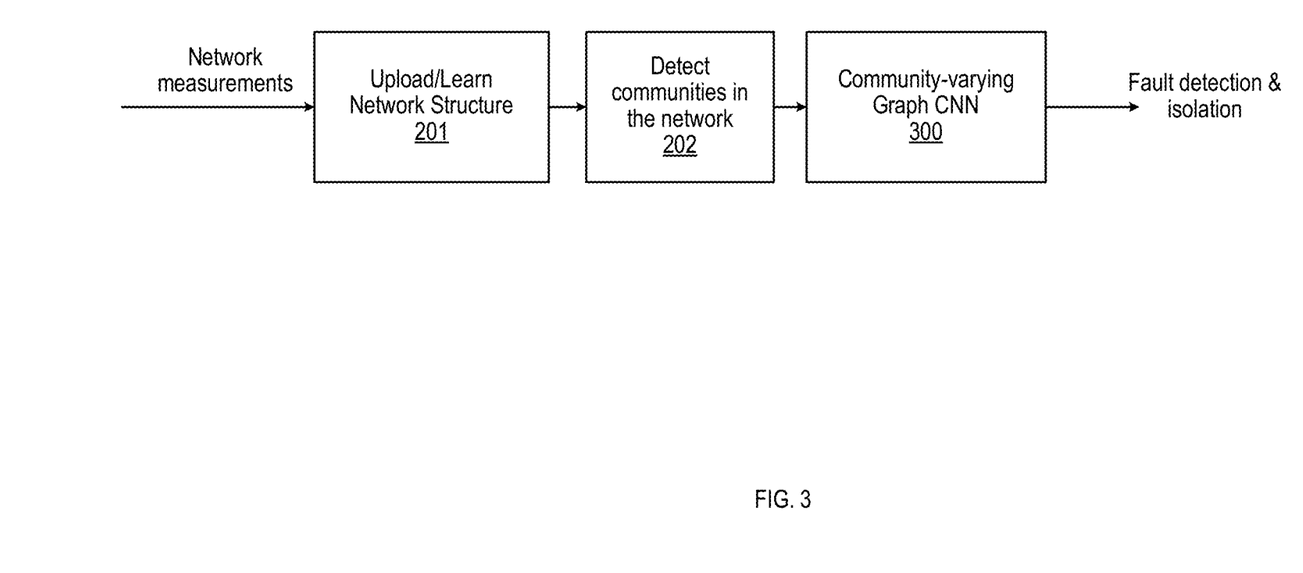
FIG. 3 illustrates an example flow diagram in accordance with the second example implementation

In the second example implementation, a community-varying Graph Convolutional Neural Networks (Graph-CNN) is utilized to perform maintenance recommendation. Like Convolutional Neural Networks (CNN), Graph-CNN provides an end to end solution by operating as feature extractors plus classifiers. Therefore, using Graph-CNN, additional feature extraction step may not be necessary. FIG. 3 illustrates an example flow diagram in accordance with the second example implementation. As illustrated in FIG. 3, As illustrated in FIGS. 2 and 3, the overall flow diagram for maintenance recommendation in industrial networks involves the steps of 1) Obtain or learn graph structure from data; 2) Detect the communities in the graph; 3) For each community, extract important features 4) Use the extracted features for fault detection and isolation and 5) For faulty components provide maintenance recommendation. Through the example implementations described herein according to the above steps, the amount of data needed to be considered can be reduced, thereby reducing the processing time required to conduct fault detection and isolation for managed components. In turn, such example implementations allow the system to manage more components than would be possible with the related art. Such technical improvements are possible because the nodes within communities are correlated correctly, so the entire graph of managed components does not need to be considered when conducting fault detection and isolation when a single component is concerned. Further, such example implementations allow for fault detection and isolation systems to be generated with fewer example requirements, thereby requiring a smaller database for conducting training as such information can be determined through correlations within communities instead.

Further, example implementations described herein do not assume a single fault scenario and can detect and isolate simultaneous faults in the system in accordance with the desired implementation.

Community Detection

At first, community detection in the graph is described, along with the two example implementations for maintenance recommendation based on using the graph structure. The community detection problem involves dividing the components of given industrial networks into subsets such that the components within each subset are highly related to each other, while the components in different subsets are not. The community detection algorithms involve two general steps: 1) define the distance between each two components, and 2) cluster similar components Example implementations utilize a graph structure to detect communities for community detection. First, the weighted adjacency matrix, W, is utilized to extract the Laplacian matrix. Weighted adjacency matrix is a matrix representation of the graph structure. When there is an edge between node i and node j, $w_{ij} \in W$ represent the weight edge between i and j. When there is no edge between i and j, $w_{ij}=0$.

The degree matrix of a graph D, is a diagonal matrix where an element on the main diagonal, $d_{ii}$ is the weighted sum of all the edges connected to node i. A diagonal matrix is a square matrix in which the elements outside the main diagonal are all zero. The difference between weighted adjacency matrix and degree matrix of a graph is called the graph Laplacian matrix, L.

$$L=D-W$$

After computing the Laplacian matrix, the eigenvectors of the matrix are computed and utilized as the features for the selected clustering algorithm. Different clustering algorithms such as k-means clustering and hierarchical clustering can be used in this step. Clustering is utilized to cluster similar components or apparatuses in the industrial network to each other. The clusters that are formed using the clustering methods are utilized as the communities for the industrial network, as faults occurring within a community tend to either have a root cause from components within the community, or can indicate that another component in the community may fail.

Figure 4:
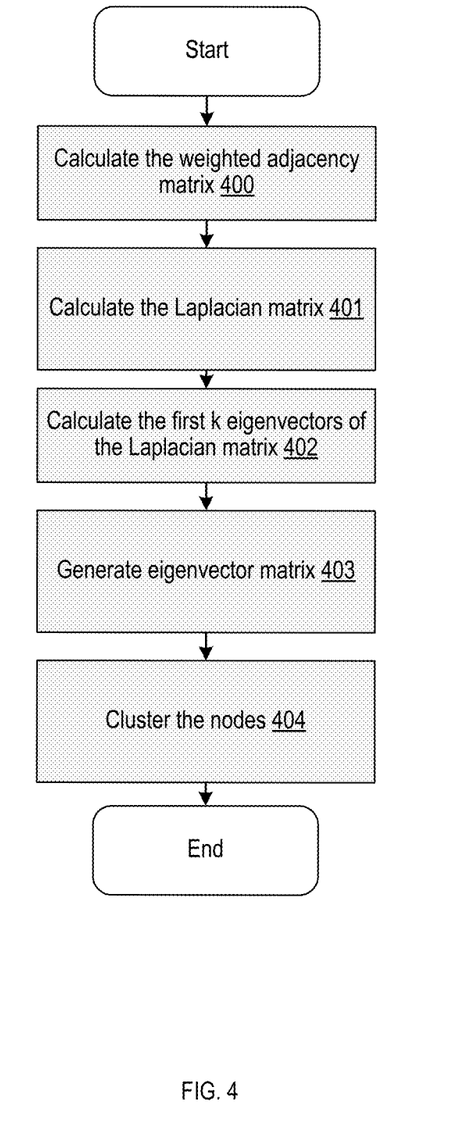
FIG. 4 illustrates an example flow for community detection, in accordance with an example implementation.

FIG. 4 illustrates an example flow for community detection, in accordance with an example implementation. The flow is executed to detect communities in the network 202 as illustrated in FIGS. 2 and 3. At 400, the flow calculates the weighted adjacency matrix, W. At 401, the flow calculates the Laplacian matrix L. At 402, the flow calculates the first k eigenvectors of L: $v_1, \ldots, v_k$. At 403, the flow generates the eigenvector matrix, $V \in R^{n \times k}$ where $v_1, \ldots, v_k$ are the columns of the matrix. At 404, the flow clusters the nodes using k-means or hierarchical clustering where the feature for node i is the vector corresponding to the $i^{th}$ row of V. Thus, through example implementations, individual components do not have to be analyzed by separate machine learning models. Related components within the community can indicate that a fault has occurred in the component, even if the sensor data from the component indicates that the component is operating normally. In an example involving a water tank with a leak, it may affect the pressure reading in another component even if the component is operating normally, as the leak of the water tank will affect other components.

Fault Detection and Isolation

Two example implementations are described herein for the fault detection and isolation step. In a first example implementation, graph embedding is utilized to extract a set of features for each community. A classifier is then applied to classify components as normal or faulty. In a second example implementation, community-varying graph-CNN is utilized, which learns a set of features from each community and classifies the components as normal and faulty.

First Example Implementation—Graph Embedding

Machine Learning (ML) tools are developed to operate on vector space. In vector spaces, distance metrics (e.g., Euclidian distance) can be utilized to get qualitative results. Graphs represent much more complex data structure. In related art implementations, graph embedding has been used to transfer graph data to the vector space. Graph embedding is a mapping from graph domain to vector space domain where the dimension of the data in the vector space is less than or equal to the number of nodes in the graph multiplied by the number of measurements within each node, and the mapped data preserve some of the properties of the graph dataset. The embeddings can be used as the input features for related art machine learning algorithms, and therefore, there is no need for complex methods which can directly operate on the graphs.

For networks with few nodes and limited connection between higher order neighbors, graph embedding is utilized in a first example implementation. Graph embedding maps graph dataset generated from a network dataset to a vector space, while preserving relevant network properties. In graph theory, the number of hops is the minimum number of nodes that must be passed to get to the destination node. K-hop neighborhood of each node are the set of nodes that are reachable from the node in maximum k hops.

In many real-world networks after few hops, there is no meaningful relationship between components (e.g., a tank pressure in the water supply network may be highly correlated to the pressures of the neighboring tanks but almost independent from remote tanks). The community detection step is utilized to discover components with meaningful connections. After detecting the communities in the network, it is possible to map data structure from graph domain to vector space by considering the neighboring community measurements of each node as the set of features for the node. After graph embedding, related art machine learning classifiers can be used to learn a diagnosis model which uses each node features in vector space to classify the nodes as normal or faulty.

For systems with few nodes and limited connection between higher order neighbors, graph embedding provide a simple solution, however, it is not trivial to preserve graph properties and the connection between individual nodes through embedding. Most industrial networks have thousands of nodes and therefore, defining a scalable embedding model and preserving graph properties at the same time can be challenging. Graph reconstruction precision can be improved by increasing dimensionality of the embedding, but higher dimensionality means higher time and more space complexity. In general, graph embedding leads to information loss and extra space and computational complexity. A more efficient approach is to adapt ML algorithms to the graph domain.

Second Example Implementation—Graph Convolutional Neural Networks

Convolutional Neural Networks (CNN) have improved image classification performance significantly. Unlike classical neural networks such as Multilayer Perceptron (MLP) Neural Networks, CNNs can extract local relationships between input data by using localized convolutional filters. Convolutional filters extract identical features in different spatial locations. These stationary filters have led to breakthroughs in image and video classification. Similarly, extracting local relationships between industrial variables in different components can improve fault detection and isolation significantly. Like images, the industrial datasets often represent a structure. For example, in an electric power plant, a major station measurement may be independent from a small load measurement, but they are highly correlated to the power plant measurements. Unfortunately, CNNs are defined for regular data structures (grids) only and cannot be applied to irregular structures such as industrial network datasets.

Graph Convolutional Neural Networks (Graph-CNN) have been introduced to generalize CNN to irregular (non-Euclidean) domains such as chemical molecules, and social networks. Graphs can represent different neighborhood structures and connectivity matrixes as well as non-Euclidean metrics. In example implementations described herein, fault detection and isolation are formulated in dynamic systems using sensor data as an undirected graph node classification problem. Therefore, community-varying Graph-CNN can be utilized to develop another approach for solving this problem. Experiments on several datasets demonstrated that the approach described herein can improve maintenance recommendation performance by capturing the relationship between related measurements in different components in each community.

Convolutional Neural Networks (CNNs) use convolutional filters to extract features from images. Similarly, Graph-CNNs use Graph Fourier Transform (GFT) to extract features from the graphs. Weighted adjacency matrix, W, is a matrix representation of a weighted graph. When there is an edge between node i and node j, $w_{ij} \in W$ represent the weight edge between i and j. When there is no edge between i and j, $w_{ij}=0$. A diagonal matrix is a square matrix which the elements outside the main diagonal are all zero. The degree matrix of a graph D, is a diagonal matrix where an element on the main diagonal, $d_{ii}$ is the weighted sum of all the edges connected to node i. The difference between weighted adjacency matrix and degree matrix of a graph is called a Laplacian matrix. Graph Fourier Transform (GFT) is defined based on Laplacian matrix eigen-decomposition. Eigen-decomposition represents a square matrix in terms of its eigenvectors and eigenvalues. Consider U as the matrix of eigen-vectors generated by Laplacian matrix eigen-decomposition. Z=GFT(X) is defined equal to U transform multiplied by graph signals.

$$Z=U^T X$$

Graph-CNN applies GFT to transfer the signals to graph Fourier domain using U matrix. It then applies a filter in the graph Fourier domain to extract graph features. A k-hop localized filter uses any pair of nodes with shortest path distance less than K to extract the features. Finally, it applies Inverse-GFT to transfer features to the time domain. GCNN uses data to learn graph Fourier domain filter coefficients.

Figure 5A:
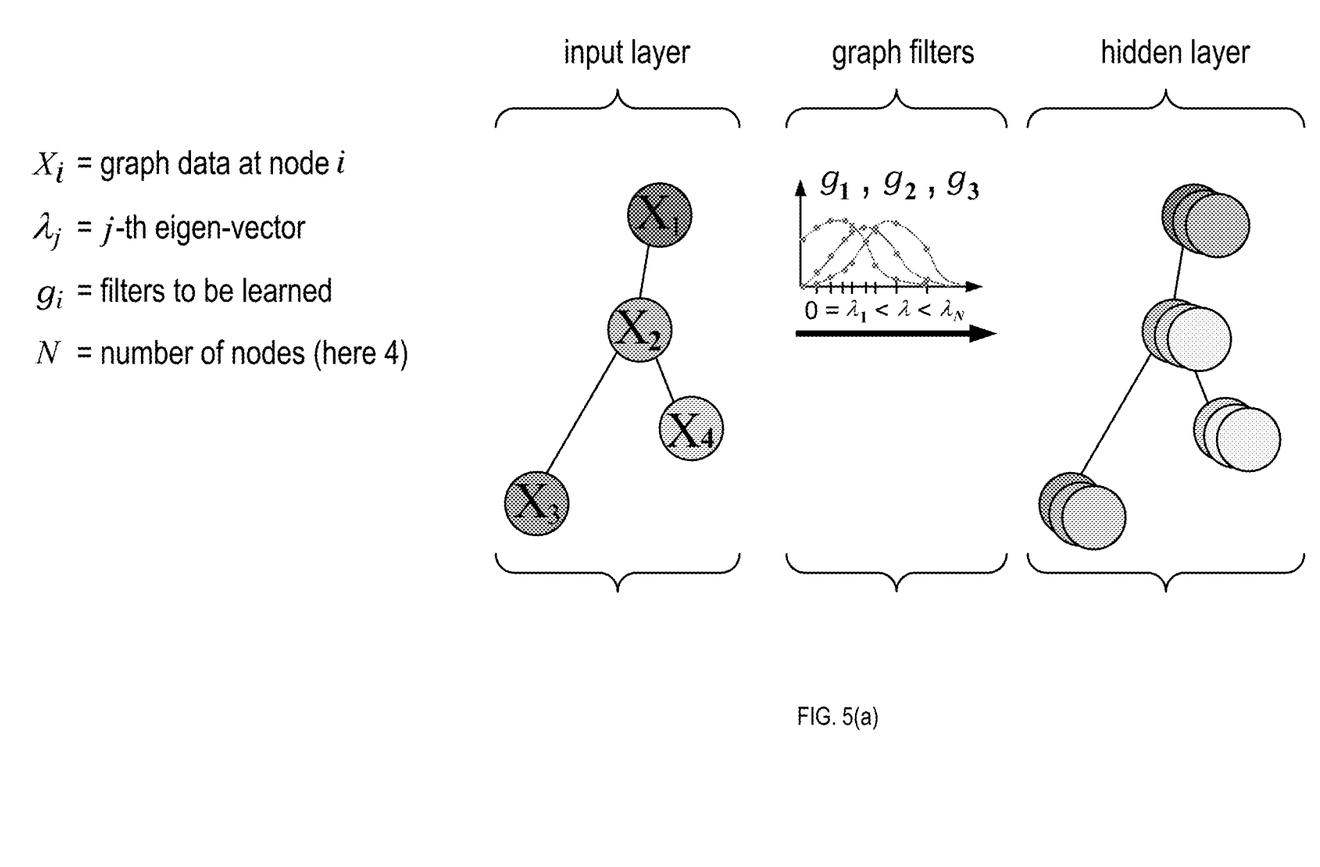

Matrix eigen-decomposition is computationally expensive. Chebyshev polynomial approximation can be used to estimate filter coefficients without eigen-decomposition. A Chebyshev approximation of a k-hop graph filter can be written as $X_f=(a_0 I+a_1 L+a_2 L^2+ \ldots +a_k L^k)X$, where X is the graph signal, $X_f$ is the filtered graph signal, L is the graph Laplacian matrix and $a_i$s are scalar coefficients. A set of graph filters generate for each community is a graph convolutional layer in Graph-CNN. FIG. 5(a) illustrates a graph convolutional layer in a graph convolutional neural network, in accordance with an example implementation. As illustrated in FIG. 5(a), the graph convolutional layers includes several graph filters. After learning the coefficients, each layer maps the input signals to the outputs.

Figure 5B:
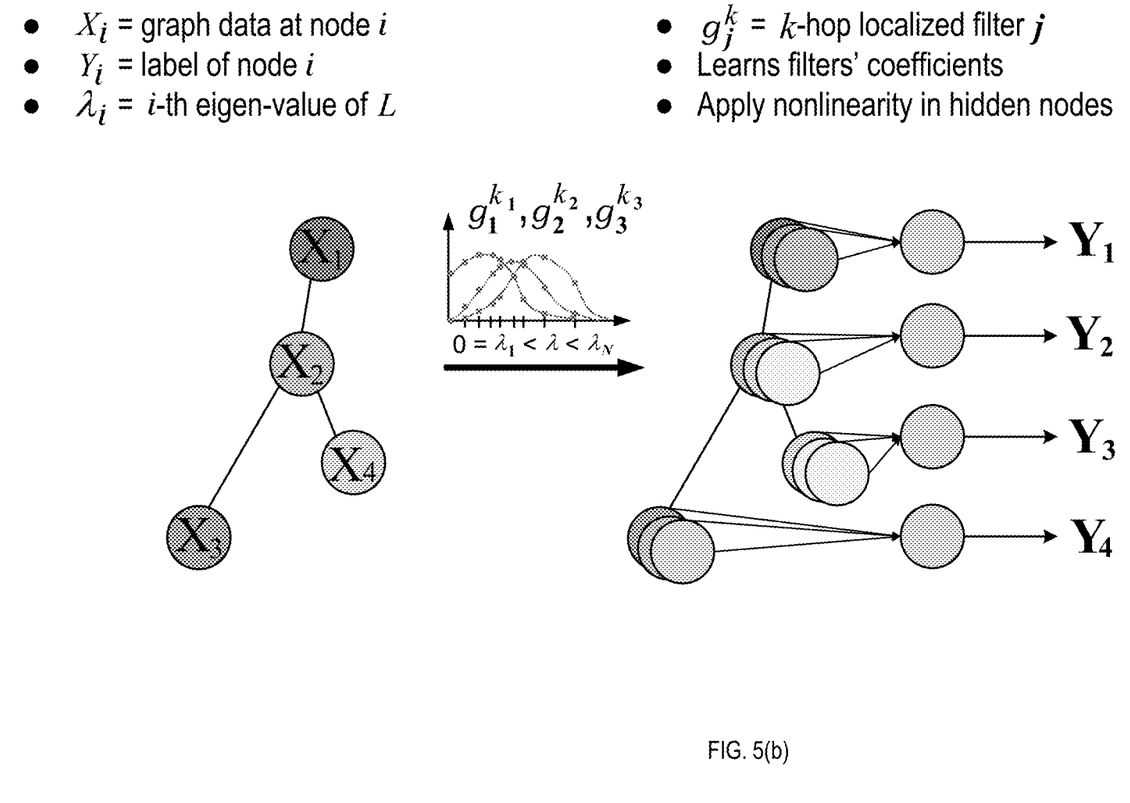

Using nonlinear activation functions, Graph-CNNs are capable of learning complex relationships between signal nodes. In example implementations described herein, the fault detection and isolation problem are formulated as node classification problems. Community-varying graph CNN learns a set of coefficients for each community and uses these features in addition to the original measurements to solve the problem. FIG. 5(b) illustrates fault detection and isolation in accordance with an example implementation. $X_i$ represents the signal measurements of component i. $Y_i$ represents label of node i which can be normal or faulty. A k hop graph convolutional layer extracts features using nodes with shortest path distance less than K in each community.

Figure 6:
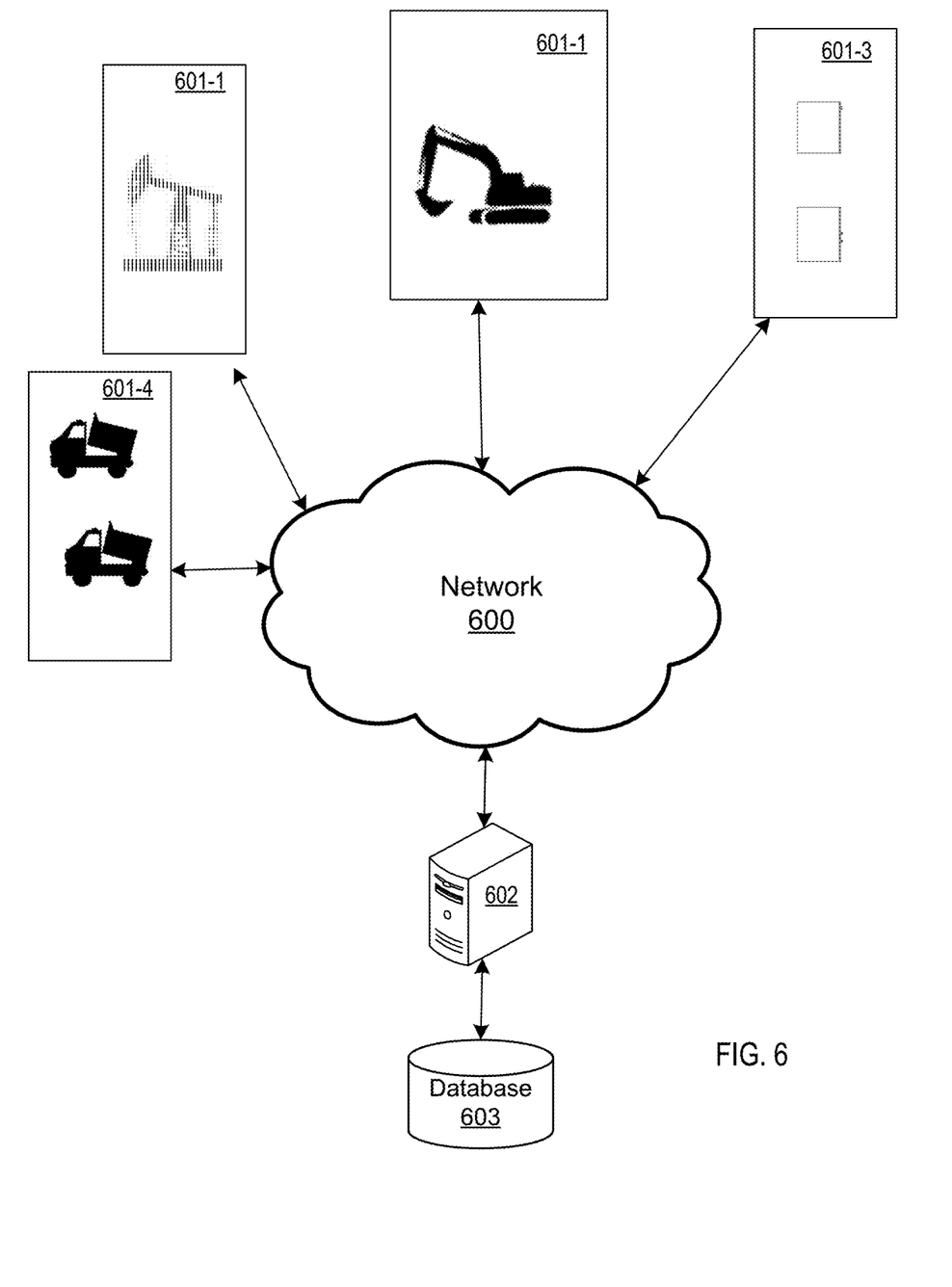
FIG. 6 illustrates a system involving a plurality of apparatuses and a management apparatus, in accordance with an example implementation.

FIG. 6 illustrates a system involving a plurality of apparatuses and a management apparatus, in accordance with an example implementation. One or more apparatuses or apparatus systems 601-1, 601-2, 601-3, and 601-4 are communicatively coupled to a network 600 which is connected to a management apparatus 602. The management apparatus 602 manages a database 603, which contains historical data collected from the apparatuses and apparatus systems in the network 600. In alternate example implementations, the data from the apparatuses and apparatus systems 601-1, 601-2, 601-3, and 601-4 can be stored to a central repository or central database such as proprietary databases that data from equipment or equipment systems such as enterprise resource planning systems, and the management apparatus 602 can access or retrieve the data from the central repository or central database. Such apparatuses can include stationary apparatuses or equipment with sensor systems such as coolers, water tanks, air compressors, electrical lines, as well as mobile apparatuses or equipment such as moving robots, robotic arms, as well as any other apparatuses that are integrated into the industrial networks or any other apparatus that can operate as a component that can be part of an industrial network. The sensor data provided by the one or more apparatuses can involve data while the apparatuses were operating under the normal condition, and the sensor data when the apparatuses underwent a fault. For integration into training a machine learning classifier in accordance with the example implementations described herein, the sensor data may also be labeled to indicate if the sensor data incorporated from the component is when the component is operating in a normal condition or undergoing some sort of fault.

Figure 7:
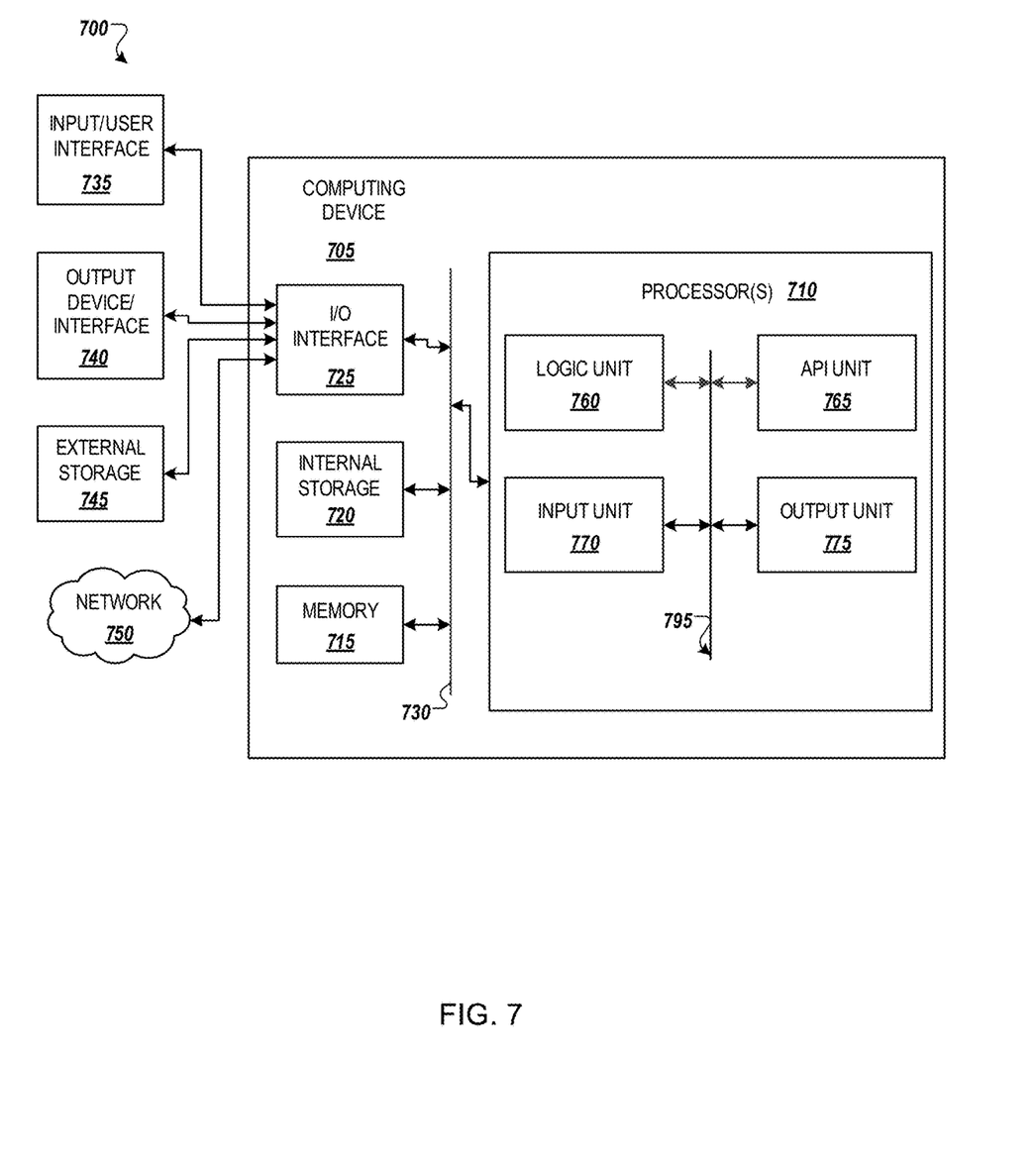
FIG. 7 illustrates an example computing environment with an example computer device suitable for use in some example implementations.

FIG. 7 illustrates an example computing environment with an example computer device suitable for use in some example implementations, such as a management apparatus 602 as illustrated in FIG. 6. Computer device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computer device 705. I/O interface 725 is also configured to receive images from cameras or provide images to projectors or displays, depending on the desired implementation.

Computer device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 740 may include a display, television, monitor, printer, speaker, braille, or the like. In some example implementations, input/user interface 735 and output device/interface 740 can be embedded with or physically coupled to the computer device 705. In other example implementations, other computer devices may function as or provide the functions of input/user interface 735 and output device/interface 740 for a computer device 705.

Examples of computer device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 705 can be communicatively coupled (e.g., via I/O interface 725) to external storage 745 and network 750 for communicating with any number of networked components, devices, and systems, including one or more computer devices of the same or different configuration. Computer device 705 or any connected computer device can be functioning as, providing services of, or referred to as a server, client, thin server, general machine, special-purpose machine, or another label.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computer device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. One or more applications can be deployed that include logic unit 760, application programming interface (API) unit 765, input unit 770, output unit 775, and inter-unit communication mechanism 795 for the different units to communicate with each other, with the OS, and with other applications (not shown). The described units and elements can be varied in design, function, configuration, or implementation and are not limited to the descriptions provided. Processor(s) 710 can be in the form of hardware processors such as central processing units (CPUs) or in a combination of hardware and software units.

In some example implementations, when information or an execution instruction is received by API unit 765, it may be communicated to one or more other units (e.g., logic unit 760, input unit 770, output unit 775). In some instances, logic unit 760 may be configured to control the information flow among the units and direct the services provided by API unit 765, input unit 770, output unit 775, in some example implementations described above. For example, the flow of one or more processes or implementations may be controlled by logic unit 760 alone or in conjunction with API unit 765.

The input unit 770 may be configured to obtain input for the calculations described in the example implementations, and the output unit 775 may be configured to provide output based on the calculations described in example implementations.

In an example implementation involving the management apparatus 602 as described in FIG. 6, that manages a plurality of apparatuses providing sensor data, processor(s) 710 can be configured to determine a graph structure from the sensor data as illustrated in 201 of FIG. 2 and FIG. 3, detect a plurality of communities in the graph structure as illustrated in 202 of FIG. 2 and FIG. 3; for each of the plurality of communities, conduct feature extraction to extract features regarding fault detection and isolation as illustrated in 203 and 300 in FIGS. 2 and 3 respectively; and provide the extracted features to a machine learning process to generate a trained machine learning model configured to conduct fault detection and isolation for the system as illustrated in 204 and 300 of FIGS. 2 and 3, respectively. Through the example implementation as described, because communities are detected from the graph structure and utilized for the machine learning process, the training process does not have to consider the entire industrial network or a single component of the industrial network, but trains against the communities which results in generating a more accurate machine learning model for detecting faults and isolating faults to components. Further, through such example implementations, the amount of data required to be utilized to train the machine learning model is reduced because the components are correlated within communities, which removes the need to require large volumes of labeled data across the entire industrial network or for a single component. Example implementations end up with a more accurate trained machine learning model due to the correlated communities, because if a failure happens to one component, the components that are highly related to this component will be also be affected.

In an example implementation, processor(s) 710 is configured to detect the plurality of communities in the graph structure by calculating a weighted adjacency matrix of the graph structure as illustrated at 400 of FIG. 4; extracting a Laplacian matrix from the weighted adjacency matrix as illustrated at 401 of FIG. 4; calculating eigenvectors to generate an eigenvector matrix as illustrated at 402 and 403 of FIG. 4; and conducting clustering on the eigenvector matrix to generate the plurality of communities as illustrated at 404 of FIG. 4.

In an example implementation, processor(s) 710 is configured to conduct feature extraction by conducting graph embedding to map the graph structure to a vector space domain for each of the plurality of communities; and training machine learning classifiers on the vector space domain for each of the plurality of communities to detect and isolate faults in each of the plurality of communities as illustrated in FIG. 2 and as described in accordance with the first example implementation.

In an example implementation, processor(s) 710 is configured to conduct feature extraction by conducting Graph Fourier Transform (GFT) on the graph structure to convert the graph structure to Fourier domain; extracting the features from the converted graph structure in the Fourier domain according to a filter; and converting the extracted features into time domain through applying an inverse GFT as illustrated in FIG. 3 and as described in accordance with the second example implementation. In an example implementation, the filter can be a k-hop graph filter so that k-hop neighbors are used in feature extraction, however other methods may also be used in accordance with the desired implementation.

Once the model is constructed, the processor(s) 710 is configured to execute the trained machine learning model on the system to conduct fault detection and isolation on the plurality of apparatuses, in a more accurate manner than would be possible than related art features.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for managing a system comprising a plurality of apparatuses providing sensor data, the method comprising:
   determining a graph structure from the sensor data;
   detecting a plurality of communities in the graph structure;
   for each of the plurality of communities, conducting feature extraction to extract features regarding fault detection and isolation; and
   providing the extracted features to a machine learning process to generate a trained machine learning model configured to conduct fault detection and isolation for the system,
   wherein the conducting feature extraction comprises:
      conducting Graph Fourier Transform (GFT) on the graph structure to convert the graph structure to Fourier domain;
      extracting the features from the converted graph structure in the Fourier domain according to a filter; and
      converting the extracted features into time domain through applying an inverse GFT, and
   wherein the filter is a k-hop graph filter, and
   wherein the conducting feature extraction comprises conducting graph embedding to map the graph structure to a vector space domain for each of the plurality of communities, and training machine learning classifiers on the vector space domain for each of the plurality of communities to detect and isolate faults in each of the plurality of communities.

2. The method of claim 1, wherein the detecting the plurality of communities in the graph structure comprises:
   calculating a weighted adjacency matrix of the graph structure;
   extracting a Laplacian matrix from the weighted adjacency matrix;
   calculating eigenvectors to generate an eigenvector matrix; and
   conducting clustering on the eigenvector matrix to generate the plurality of communities.

3. The method of claim 1, further comprising executing the trained machine learning model on the system to conduct fault detection and isolation on the plurality of apparatuses.

4. A non-transitory computer readable medium, storing instructions for executing process for managing a system comprising a plurality of apparatuses providing sensor data, the instructions comprising:
   determining a graph structure from the sensor data;
   detecting a plurality of communities in the graph structure;
   for each of the plurality of communities, conducting feature extraction to extract features regarding fault detection and isolation; and
   providing the extracted features to a machine learning process to generate a trained machine learning model configured to conduct fault detection and isolation for the system,
   wherein the conducting feature extraction comprises:
      conducting Graph Fourier Transform (GFT) on the graph structure to convert the graph structure to Fourier domain;
      extracting the features from the converted graph structure in the Fourier domain according to a filter; and
      converting the extracted features into time domain through applying an inverse GFT, and
   wherein the filter is a k-hop graph filter, and
   wherein the conducting feature extraction comprises conducting graph embedding to map the graph structure to a vector space domain for each of the plurality of communities, and training machine learning classifiers on the vector space domain each of the plurality of communities to detect and isolate faults in each of th plurality of communities.

5. The non-transitory computer readable medium of claim 4, wherein the detecting the plurality of communities in the graph structure comprises:
   calculating a weighted adjacency matrix of the graph structure;
   extracting a Laplacian matrix from the weighted adjacency matrix;
   calculating eigenvectors to generate an eigenvector matrix; and
   conducting clustering on the eigenvector matrix to generate the plurality of communities.

6. The non-transitory computer readable medium of claim 4, the instructions further comprising executing the trained machine learning model on the system to conduct fault detection and isolation on the plurality of apparatuses.

7. A management apparatus configured to manage a system comprising a plurality of apparatuses providing sensor data, the management apparatus comprising:
   a processor, configured to:
   determine a graph structure from the sensor data;
   detect a plurality of communities in the graph structure;
   for each of the plurality of communities, conduct feature extraction to extract features regarding fault detection and isolation; and
   provide the extracted features to a machine learning process to generate a trained machine learning model configured to conduct fault detection and isolation for the system,
   wherein the processor is configured to conduct feature extraction by,
      conducting Graph Fourier Transform (GFT) on the graph structure to convert the graph structure to Fourier domain;
      extracting the features from the converted graph structure in the Fourier domain according to a filter; and
      converting the extracted features into time domain through applying an inverse GFT, and wherein the filter is a k-hop graph filter, and
wherein the processor is configured to conduct feature extraction by:
    conducting graph embedding to map the graph structure to a vector space domain for each of the plurality of communities; and
    training machine learning classifiers on the vector space domain each of the plurality of communities to detect and isolate faults in each of the plurality of communities.

8. The management apparatus of claim 7, wherein the processor is configured to detect the plurality of communities in the graph structure by:
    calculating a weighted adjacency matrix of the graph structure;
    extracting a Laplacian matrix from the weighted adjacency matrix;
    calculating eigenvectors to generate an eigenvector matrix; and
    conducting clustering on the eigenvector matrix to generate the plurality of communities.

9. The management apparatus of claim 7, wherein the processor is configured to execute the trained machine learning model on the system to conduct fault detection and isolation on the plurality of apparatuses.

\* \* \* \* \*